United States Patent
Nishimura et al.

(10) Patent No.: US 7,910,161 B2
(45) Date of Patent: Mar. 22, 2011

(54) MANUFACTURING DEVICE AND MANUFACTURING METHOD FOR OPTICAL DISC

(75) Inventors: Hironobu Nishimura, Tokorozawa (JP); Masahiro Nakamura, Saitama (JP)

(73) Assignee: Origin Electric Company, Limited, Tokyo (JP)

( * ) Notice: Subject to any disclaimer, the term of this patent is extended or adjusted under 35 U.S.C. 154(b) by 693 days.

(21) Appl. No.: 11/874,246

(22) Filed: Oct. 18, 2007

(65) Prior Publication Data
US 2008/0093755 A1    Apr. 24, 2008

(30) Foreign Application Priority Data
Oct. 24, 2006   (JP) ................ P2006-288947

(51) Int. Cl.
*B29D 11/00* (2006.01)
*B29D 17/00* (2006.01)

(52) U.S. Cl. .......... 427/162; 118/52; 118/319; 118/320; 264/1.33; 264/2.1; 425/3; 425/810; 427/240

(58) Field of Classification Search ............... 264/1.33, 264/106, 107, 2.1; 425/810, 3; 156/275.5, 156/275.7; 427/162, 240; 118/52, 319, 320
See application file for complete search history.

(56) References Cited

U.S. PATENT DOCUMENTS
6,077,349 A * 6/2000 Kikuchi .................. 118/52

FOREIGN PATENT DOCUMENTS
JP    2002-316084    10/2002
JP    2005-353282    12/2005
JP    2006-059454    3/2006

* cited by examiner

*Primary Examiner* — Mathieu D. Vargot
(74) *Attorney, Agent, or Firm* — Wood, Herron & Evans, LLP

(57) ABSTRACT

This manufacturing device for an optical disc includes: a disc-supporting base on which a disc substrate is mounted; a pin-shaped member arranged at a center of the disc-supporting base, and is movable in the vertical in a center hole of the disc substrate; and a capping member which is slidably placed on a top of the pin-shaped member, and closes the center hole of the disc substrate, wherein when the capping member placed on the top of the pin-shaped member is lowered such that a back face of the capping member contacts an around of the center hole of the disc substrate mounted on the disc-supporting base, the capping member slides on the top of the pin-shaped member.

6 Claims, 6 Drawing Sheets

MANUFACTURING DEVICE AND MANUFACTURING METHOD FOR OPTICAL DISC

Priority is claimed on Japanese Patent Application No. 2006-288947, filed Oct. 24, 2006, the contents of which are incorporated herein by reference.

BACKGROUND OF THE INVENTION

1. Field of the Invention

The present invention relates to a manufacturing device and a manufacturing method for an optical disc, which can prevent involving bubbles while forming a protective film on a disc substrate or while forming an adhesive layer between disc substrates.

2. Description of the Related Art

In a conventional manufacturing method of an optical disc, when a protective film is formed on a surface of a disc substrate as an optical transparent layer, or when a adhesive layer is formed on one of or both of disc substrates in order to bond two or more of the disc substrates, a center hole of the disc substrate is closed by a capping member, and a liquid material is supplied onto the capping member. Thereafter, the liquid material uniformly outspreads over the entire surface of the disc substrate by a spin-coating method in a high-speed rotation.

FIGS. 6A to 6C show a prior art. As shown in FIG. 6A, a reversely protruding portion 43a of a capping member 43 is fitted into a dented portion 42d formed in a pin-shaped member 42c of a disc-supporting base 42 having a disc substrate 11 mounted thereon. Furthermore, the reversely protruding portion 43a is fixed into the dented portion 42d by vacuuming an inside of a vacuuming hole 42a, and thereby closing a center hole 11a of the disc substrate 11. In this construction in which: the reversely protruding portion 43a of the capping member 43 is fitted into the dented portion 42d of the pin-shaped member 42c; and furthermore, a back side of the capping member 43 is supported by a top of the pin-shaped member 42c, the capping member 43 is fixed to the pin-shaped member 42c regardless of the shape of the disc substrate 11, and thereby making it difficult to fittingly and completely attach the capping member 43 onto the disc substrate 11. For example, FIG. 6A shows a case in which there is an non-contacting portion 300 between the right side of the capping member 43 on the drawing and the disc substrate 11 (i.e., FIG. 6A shows the case where a partial gap is formed between the capping member 43 and the disc substrate 11. Moreover, the reference symbol 42b denotes absorption holes formed in the disc-supporting base 42 in order to perform a vacuum-absorption of the disc substrate 11.

Next, as shown in FIGS. 6B and 6C, liquid material 200 is supplied from a liquid supplying nozzle 100 so as to form a ring surrounding a center of the capping member 43, and the disc substrate 11 is rotated in a high-speed to spread the liquid material 200 over the disc substrate 11 using a centrifugal force. At this time, if the disc substrate 11 is rotated while having the minor gap between the disc substrate 11 and the capping member 43, there is a problem in that the liquid material 200 enters into the gap and thereby causing high possibility of involving bubbles therein. The bubbles involved in the liquid material 200 are suffered from the centrifugal force while spreading the liquid material 200 in the high-speed rotation, and move from the inward to the outward. Thus, if the liquid material 200 covering an information recording area involves the bubbles, such bubbles will cause errors in writing and reading information. In addition, even when the capping member 43 is removed after spreading the liquid material 200 while having the minor gap between the disc substrate 11 and the capping member 43, there are high possibility of swallowing the liquid material 200 into the gap and thereby generating the bubbles, or of mixing with the liquid material 200 already entered in the gap and thereby generating the bubbles.

In addition, since the disc substrate 11 is held by the vacuum adsorption on the disc-supporting base 42, the liquid material 200 is drawn and easily enters into the gap between the capping member 43 and the disc substrate 11 through a gap between the center hole 11a of the disc substrate 11 and the pin-shaped member 42c. Furthermore, even in the case in which the capping member 43 is held by a vacuum adsorption on the pin-shaped member 42c, the liquid material 200 is drawn and easily enters into the gap between the disc substrate 11 and the capping member 43. As mentioned in the above, the bubbles on the disc substrate 11 will cause problems in the quality and the appearance of the disc substrate 11.

Therefore, the numbers of countermeasures are proposed for a method of improving the contact between the capping member and the disc substrate. For example, there is a proposed a construction in which: a space is formed between the capping member and the pin-shaped member; and making the space into a vacuumed state through a vacuuming device connected to a vacuuming path, and thereby pressing down the capping member to fittingly fix it onto the disc substrate (for example, refer to Japanese Unexamined Patent Application, First Publication No. 2002-316084, Japanese Unexamined Patent Application, First Publication No. 2005-353282, and Japanese Unexamined Patent Application, First Publication No. 2006-59454).

The contact between the disc substrate and the capping member is significantly influenced by the processing accuracies of the disc substrate, the capping member, and the like. In the above-mentioned conventional art, the capping member can be pressed down to only one direction which is substantially vertical to the disc substrate, by a vacuum adsorption or other attracting mechanisms. In order to completely seal the around of the center hole of the disc substrate with the capping member, it was necessary to strongly press the capping member onto the disc substrate. However, even when the capping member is strongly pressed, it was still difficult to completely close the center hole. In addition, increasing the pressing force onto the disc substrate may cause deformations and curbing thereof, and thereby influences on the quality. In this construction, there is a case in which the pressing force onto the disc substrate partially increases. In such a case, the problems of causing the deformations and the curving of the disc substrate become severe.

In view of the above-mentioned circumstances, the present invention has an object of providing a manufacturing device and a manufacturing method for an optical disc, which can increase the contact between a disc substrate and a capping member, and thereby suppressing involving bubbles into liquid material.

SUMMARY OF THE INVENTION

The present invention employed the followings in order to achieve the above-mentioned object.

That is, the present invention employs a manufacturing device for an optical disc, including: a disc-supporting base on which a disc substrate is mounted; a pin-shaped member arranged at a center of the disc-supporting base, and is movable in the vertical in a center hole of the disc substrate; and a capping member which is slidably placed on a top of the pin-shaped member, and closes the center hole of the disc substrate, wherein when the capping member placed on the top of the pin-shaped member is lowered such that a back face of the capping member contacts an around of the center hole of the disc substrate mounted on the disc-supporting base, the capping member slides on the top of the pin-shaped member.

According to the manufacturing device for an optical disc, when the capping member contacts the disc substrate, the capping member slides on the top of the pin-shaped member, following the flatness of a location on the around of the center hole of the disc substrate where the capping member contacts. Therefore, it is possible to: press the around of the center hole of the disc substrate with uniform pressing force; and obtain high contact between the capping member and the disc substrate with the small pressing force.

The capping member may contact the top of the pin-shaped member so as to form a circular-shaped line contact or a circular-shaped point contact.

In this case, the capping member contacts the pin-shaped member with a small contacting area; therefore, the capping member can freely slide on the top of the pin-shaped member.

It may be arranged such that: the pin-shaped member has a supporting portion formed in an arc-shaped cross section; and the capping member has a circular-shaped supported portion having an edged cross-section that corresponds to the supporting portion.

In this case, when the capping member contacts the disc substrate, the contacting force with the disc substrate will be applied onto the back-face ring-shaped portion of the capping member, and the capping member can slide on the top of the pin-shaped member, following the flatness of a location on the around of the center hole of the disc substrate where the capping member contacts.

It may be arranged such that: the pin-shaped member has a supporting portion formed in a taper-shaped cross section; and the capping member has a circular-shaped supported portion formed in an edged cross-section that corresponds to the supporting portion.

In this case, when the capping member contacts the disc substrate, the contacting force with the disc substrate will be applied onto the back-face ring-shaped portion of the capping member, and the capping member can slide on the top of the pin-shaped member, following the flatness of a location on the around of the center hole of the disc substrate where the capping member contacts.

It may be arranged such that: the capping member has a back-face ring-shaped portion which contacts the around of the center hole of the disc substrate.

In this case, since only the back-face ring-shaped portion can contact without contacting an entire of a back face of the capping member onto the disc substrate, it is possible to easily follow the flatness of the disc substrate, and thereby enabling increasing the contact.

In addition, the present invention also employs a manufacturing method for an optical disc, including: mounting a disc substrate on a disc-supporting base having a pin-shaped member that is movable in the vertical such that the pin-shaped member is inserted in a center hole of the disc substrate; placing a capping member on a top of the pin-shaped member inserted in the center hole of the disc substrate; lowering the pin-shaped member together with the capping member placed on the top of the pin-shaped member; and pressing the around of the center hole of the disc substrate mounted on the disc-supporting base with the capping member to close the center hole of the disc substrate, wherein when the pin-shaped member is lowered such that a back face of the capping member contacts the around of the center hole of the disc substrate, the capping member slides on the top of the pin-shaped member.

According to the manufacturing method for an optical disc, when the capping member contacts the disc substrate, the capping member slides on the top of the pin-shaped member, following the flatness of a location on the around of the center hole of the disc substrate where the capping member contacts. Therefore, it is possible to: press the around of the center hole of the disc substrate with uniform pressing force; and obtain high contact between the capping member and the disc substrate with the small pressing force.

DETAILED DESCRIPTION OF THE INVENTION

Figure 1:
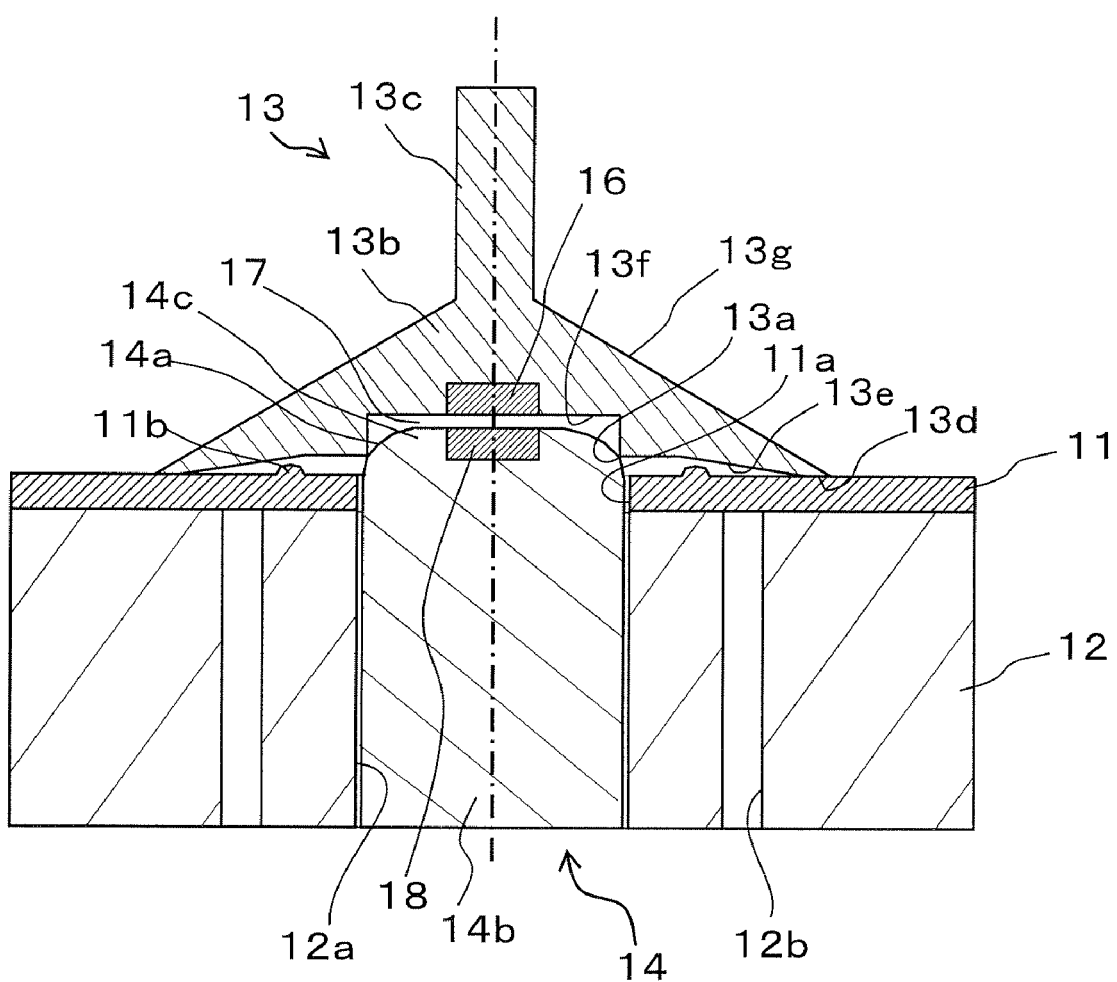
FIG. 1 shows a cross-sectional view of a manufacturing device for an optical disc, according to a first embodiment of the present invention.

Embodiments of the present invention will be explained below with reference to the drawings. Moreover, in the drawings, the same reference symbols will be applied to the same or the corresponding elements, and the explanations therefor will be omitted.

First Embodiment

FIG. 1 shows a cross-sectional view of a manufacturing device for an optical disc, according to a first embodiment of the present invention. A disc substrate 11 is placed on a disc-supporting base 12, and a pin-shaped member 14 arranged in a center hole 12a of the disc-supporting base 12 is inserted in a center hole 11a of the disc substrate 11. The disc substrate 11 is vacuum-absorbed by a non-illustrated vacuuming device through plural of vacuuming holes 12b formed in the disc-supporting base 12. The center hole 11a of the disc substrate 11 is closed by a capping member 13 placed on the disc substrate 1. The disc-supporting base 12 and the pin-shaped member 14 are connected to a non-illustrated rotation device. The liquid material is supplied onto the capping member 13 that closes the center hole 11a of the disc substrate 11, while rotating the disc-supporting base 12 in a low speed; and thereafter, the disc-supporting base 12 and the pin-shaped member 14 are rotated in a high speed to spread the liquid material on the disc substrate 11. Moreover, the liquid material may be supplied by rotating a liquid material supplying nozzle in stead of rotating the disc-supporting base 12 in a low speed.

The pin-shaped member 14 is formed by: a rod-shaped body section 14b; and a protruding section 14c having a smaller diameter than that of the rod-shaped body section 14b, and protrudes from the center hole 11a of the disc substrate 11 when the disc substrate 11 is placed on the disc-supporting base 12. The diameter of the body section 14b is slightly smaller than the inner diameter of the center hole 11a of the disc substrate 11. As mentioned in the above, a supporting portion 14a having an arc-shaped cross section is formed between the body section 14b and the protruding section 14c. In addition, the pin-shaped member 14 is joined via an elastic member such as a spring with a non-illustrated a vertical driving device, and can move in the vertical direction in the center hole 11a of the disc substrate 11, in relation to the disc substrate 11.

The capping member 13 is mainly formed from a hold section 13c and a cone-shaped section 13b. The cone-shaped section 13b includes an inclining section 13g that inclines in relation to the disc substrate 11 so as to form a mountain-shape. A back-face ring-shaped portion 13d which forms a ring contacting the surface of the disc substrate 11 is formed at the below of the inclining section 13g. In addition to the back-face ring-shaped portion 13d, the inclining section 13g is formed with a first dented portion 13e which is non-contact with the disc substrate 11, and the second dented portion 13f arranged at the inside of the first dented portion 13e. At the boundary between the first dented portion 13e and the second dented portion 13f, a supported portion 13a having an edged portion is formed in a circular shape. Normally, in the disc substrate 11, the diameter of the center hole 11a is about 15 mm and the inner diameter a recording area is 43 mm to 46 mm; therefore, the outer diameter of the capping member 13 is about 20 mm to 25 mm. However, the outer diameter of the capping member 13 is not limited to this size.

FIG. 1 shows the disc substrate 11 in a state where the center hole 11a is closed by the capping member 13. The capping member 13 is supported on the pin-shaped member 14 at the supported portion 13a, while the back-face ring-shaped portion 13d of the capping member 13 contacts in a circular manner with the around of the center hole 11a of the disc substrate 11. In this state, the second dented portion 13f has no contact with the protruding section 14c of the pin-shaped member 14, and a gap 17 is formed therebetween. Moreover, the cross-sectional shape of the circular supported portion 13a is not limited to the edged shape, and may be a reversely protruding shape (i.e., a dented shape) if only the supported portion 13a could contact in a circular manner with the supporting portion 14a of the pin-shaped member 14 with a small contact area. Furthermore, the angle of the cross-sectional edged shape is not limited if only the angle is enough for forming the edge.

In the present embodiment, the cone-shaped section 13b of the capping member 13 is provided with a magnet 16, while the protruding section 14c of the pin-shaped member 14 is provided with a magnet 18 having a different magnetic pole. The magnet 16 provided on the capping member 13 is attracted by the magnet 18 provided on the pin-shaped member 14, and thereby holding the capping member 13 on the pin-shaped member 14. The holding strength relies on the magnetic force of the magnets 16 and 18, and the size of the gap 17. Moreover, if either one of the capping member 13 and the pin-shaped member 14 is formed from a magnetic metal, the magnet may be provided only on the another. Otherwise, it may be arranged such that an absorption hole communicating with the gap 17 is provided on the pin-shaped member 14, and the capping member 13 is held by performing a vacuum adsorption.

Moreover, the reference symbol 11b denotes a circular-shaped protruding portion formed on a surface of the disc substrate 11, which may not be formed depending on the type of the disc substrate 11. If the protruding portion 11b is formed on the surface of the disc substrate 11, the first dented portion 13e of the capping member 13 prevents a contact between the back face of the capping member 13 and the circular-shaped protruding portion 11b.

Figure 2A:
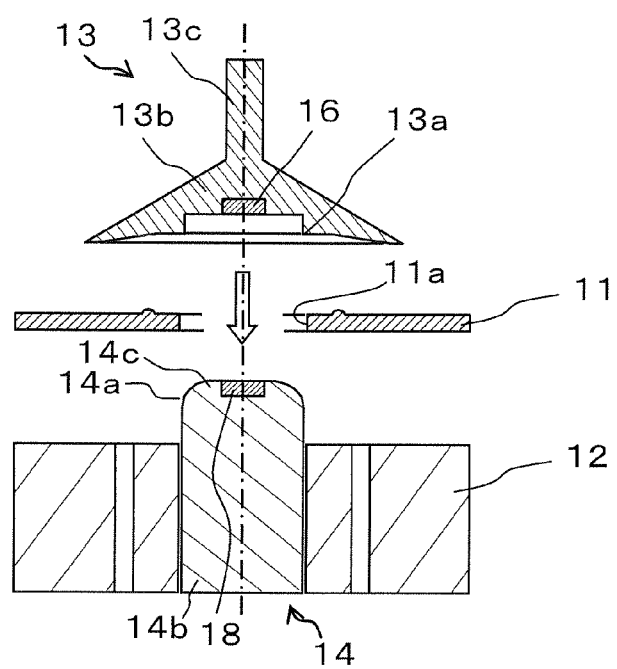
FIG. 2A shows a cross-sectional view of the manufacturing device, and shows an operation thereof.

Next, a series of operations for mounting the capping member 13 onto the disc substrate 11 will be explained with reference to FIGS. 2A to 2C. Firstly, as shown in FIG. 2A, the disc substrate 11 is paced on the disc-supporting base 12. At this time, the pin-shaped member 14 to be inserted into the center hole 11a of the disc substrate 11 is in a lifted position. In addition, centering of the disc substrate 11 is performed by the pin-shaped member 14 so as to be positioned at an appropriate position on the disc-supporting base 12. When the disc substrate 11 is placed on the disc-supporting base 12, non-illustrated cap moving device will hold the hold section 13c of the capping member 13 placed on another pace, and move the capping member 13 onto the above of the center axis of the pin-shaped member 14.

Figure 2B:
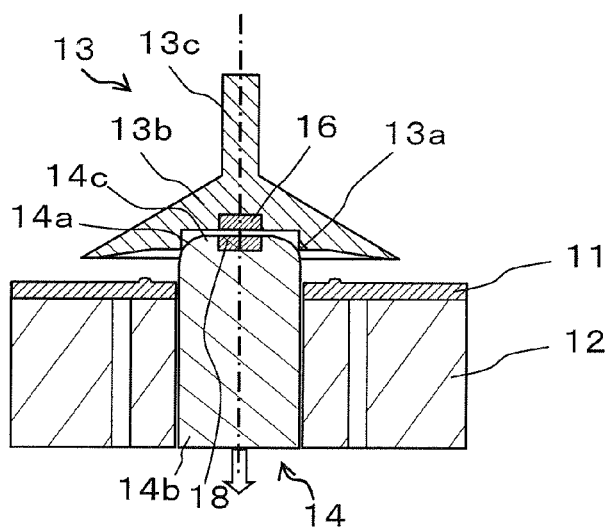
FIG. 2B shows a cross-sectional view of the manufacturing device, and shows the subsequent operation thereof.

As shown in FIG. 2B, the capping member 13 which has moved on the above of the pin-shaped member 14 is lowered along the center axis of the pin-shaped member 14, and is placed on the protruding section 14c of the pin-shaped member 14. At this time, the magnet 16 of the capping member 13 is attracted by the magnet 18 of the pin-shaped member 14, while the supported portion 13a of the capping member 13 makes a circular-line contact with the around of the supporting portion 14a having an arc-shaped cross-section, and thereby supporting the capping member 13 onto the pin-shaped member 14.

Figure 2C:
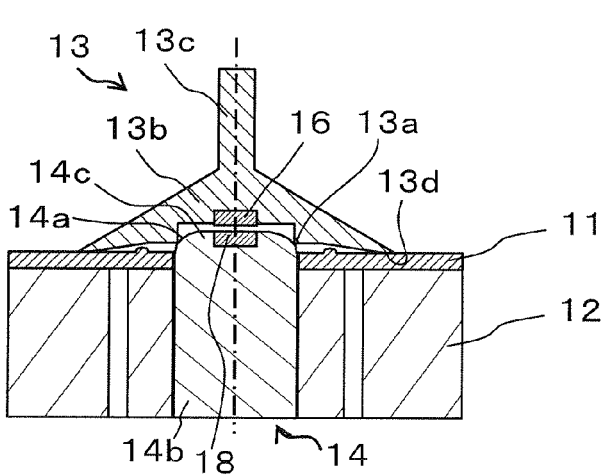
FIG. 2C shows a cross-sectional view of the manufacturing device, and shows the subsequent operation thereof.

When the capping member 13 is mounted on the pin-shaped member 14, as shown in FIG. 2C, the pin-shaped member 14 is lowered in order to cover the around of the center hole 11a with the capping member 13, and thereby closing the center hole 11a. When the back-face ring-shaped portion 13d contacts the surface of the disc substrate 11, the around of the center hole 11a on the disc substrate 11 is covered with a predetermined pressing force. If this pressing force is too high, an excessive stress will be applied onto the disc substrate 11, and may cause scratches or the like on the surface of the disc substrate 11, depending on the surface status of the back-face ring-shaped portion 13d. On the other hand, if the pressing force is too low, the disc substrate 11 and the capping member 13 will not make a close contact with each other, and thereby causing a gap therebetween. In this case, the adhesive material will be entered to the gap, and thereby involving bubbles therein. However, in the present embodiment, the pressing force is determined by the force of the pin-shaped member 14 depressing down the capping member 13, the holding power between the pin-shaped member 14 and the capping member 13, and the like. An appropriate pressing force will be within a range between −35 kPa and −40 kPa in a gauge negative pressure of a vacuuming switch. Moreover, the holding power between the pin-shaped member 14 and the capping member 13 is mainly determined by: the magnetic forces of the magnet 16 provided on the capping member 13 and the magnet 18 provided on the pin-shaped member 14; and the size of the gap 17 formed between the second dented portion 13f of the capping member 13 and the protruding section 14c of the pin-shaped member 14. Moreover, in the present embodiment, the size of the gap 17 is within a range between 0.1 mm to 1 mm. However, the size of the gap 17 should be determined in relation to the magnetic forces of the magnets 16 and 18, and is therefore not limited to the above-mentioned range.

When the pin-shaped member 14 is lowered, the back-face ring-shaped portion 13d of the capping member 13 contacts the disc substrate 11 with the predetermined force, and the back-face ring-shaped portion 13d of the capping member 13 will receive a pressing force from the disc substrate 11. Like this, the supported portion 13a of the capping member 13 is held on the supporting portion 14a of the pin-shaped member 14 with the most suitable holding force, while the supported portion 13a of the capping member 13 makes a circular line contact with the supporting portion 14a of the pin-shaped member 14 to be supported thereon. Therefore, when a small force is applied on the back-face ring-shaped portion 13d of the capping member 13, the capping member 13 can freely and slidably moves on the around of the pin-shaped member 14. Accordingly, the position of the capping member 13 is adjusted so as to compensate non-contact portion between the back-face ring-shaped portion 13d of the capping member 13 and the disc substrate 11, and thereby the entire face of the back-face ring-shaped portion 13d of the capping member 13 contacts the disc substrate 11 uniformly. That is, the pressing force of the capping member 13 onto the contacting portion on the disc substrate 11 will be uniform, and thereby making a close-contact between the capping member 13 and the disc substrate 11. The pressing force of the capping member 13 pressing the disc substrate 11 changes depending on the width of the back-face ring-shaped portion 13d of the capping member 13, and in the present embodiment, the width of the back-face ring-shaped portion 13d is within a range between 0.1 mm to 3 mm. Moreover, the width of the back-face ring-shaped portion 13d should be adjusted depending on the contacting state between the capping member 13 and the disc substrate 11. Considering the processing accuracies of the capping member 13, the disc substrate 11, and the like, it is preferable that the contact area between the capping member 13 and the disc substrate 11 is small as possible while the width of the back-face ring-shaped portion 13d is narrower.

The present embodiment has a unique point in that the capping member 13 is slidably mounted on the pin-shaped member 14 by employing: appropriate size of the gap 17 formed between the second dented portion 13f of the capping member 13 and the protruding section 14c of the pin-shaped member 14; and appropriate strength of the magnetic force for holding the capping member 13 onto the pin-shaped member 14.

Figure 3:
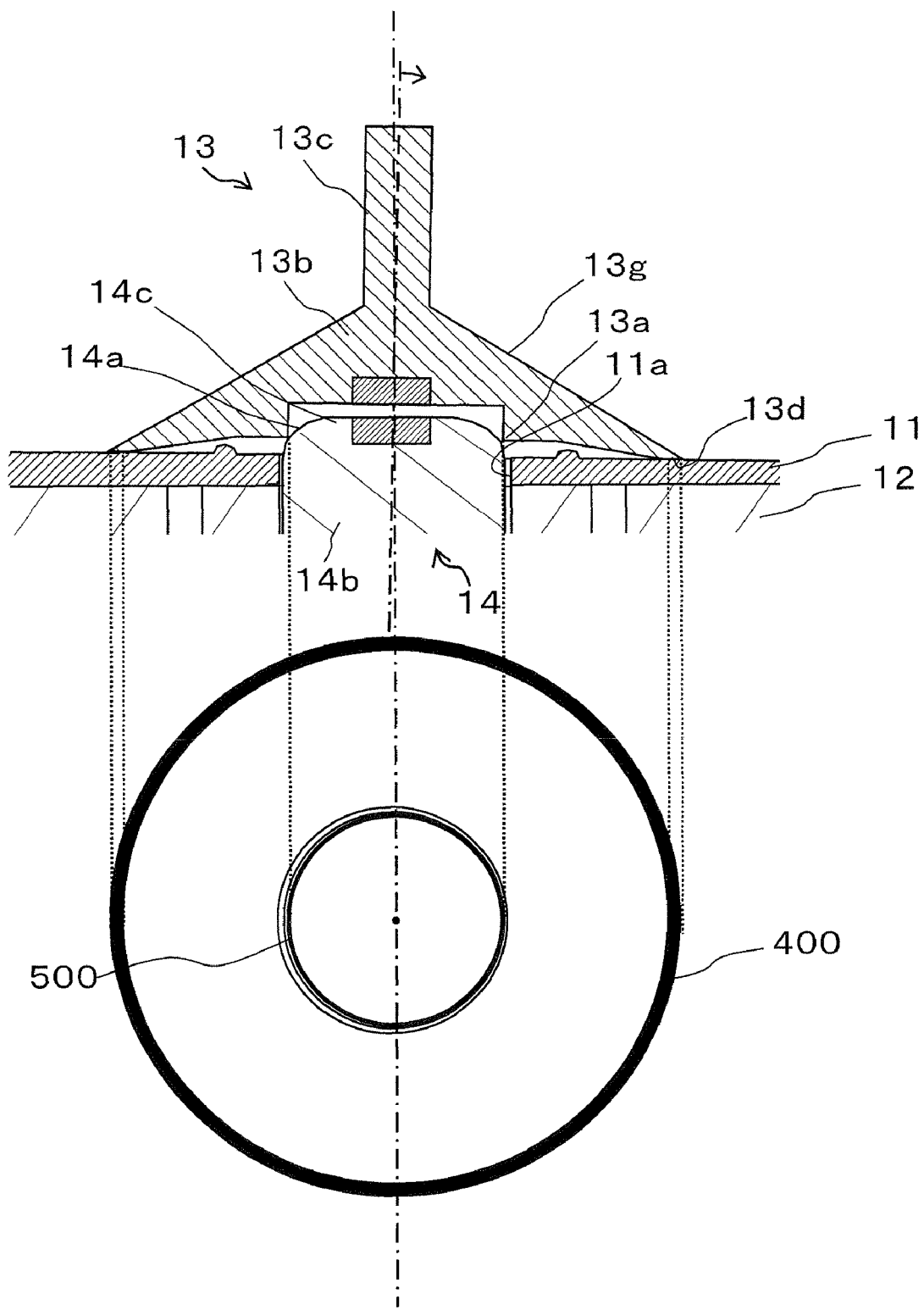
FIG. 3 shows a cross-sectional view of the manufacturing device for an optical disc in which a capping member is mounted on a disc substrate.

FIG. 3 shows a cross-sectional view of a state where the capping member 13 slides on the pin-shaped member 14, and uniformly adsorbed onto the disc substrate 11. FIG. 3 also shows a state where the capping member 13 slightly slides to the right side on the paper in relation to the center axis of the pin-shaped member 14. A contacting portion 500 indicates the state where the supported portion 13a of the capping member 13 makes a circular contact with the supporting portion 14a of the pin-shaped member 14, while a contacting portion 400 indicates the state where the back-face ring-shaped portion 13d of the capping member 13 contacts the disc substrate 11.

In the present embodiment, as shown in FIG. 3, the supported portion 13a of the capping member 13 makes the circular line contact with the supporting portion 14a of the pin-shaped member 14. However, the supported portion 13a may contact the supporting portion 14a at circularly arranged plural dots, and in this case, as same as the present embodiment, the capping member 13 can slide on the pin-shaped member 14.

Figure 4:
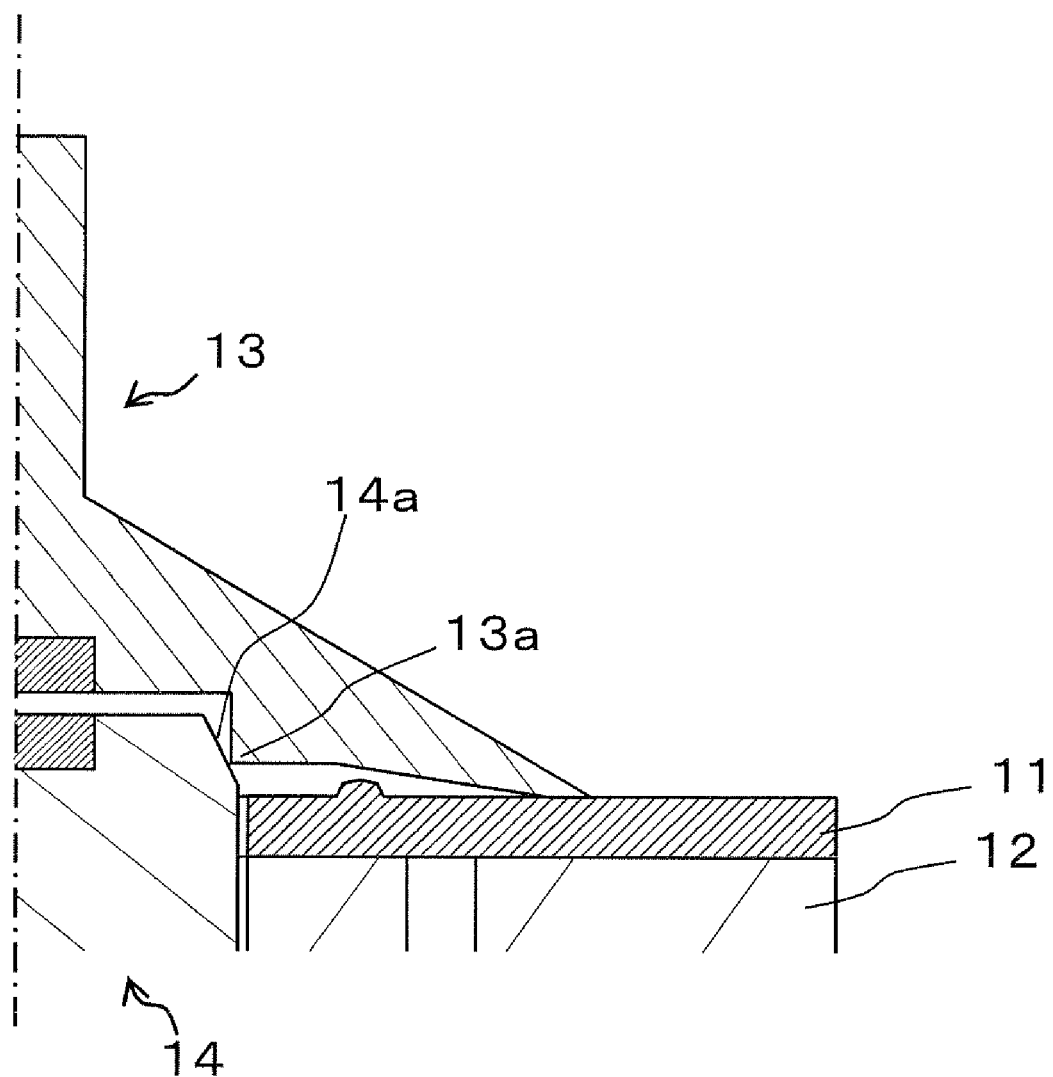
FIG. 4 shows another example of the manufacturing device for an optical disc of the first embodiment.

In addition, as shown in FIG. 4, even when the supporting portion 14a of the pin-shaped member 14 is arranged to be a tapered cross-sectional shape, the supported portion 13a of the capping member 13 can slide on the pin-shaped member 14, and thereby enabling increasing the tightness with the disc substrate 11.

In the above embodiment, the most appropriate pressing force for pressing the capping member 13 onto the disc substrate 11 is within a range between −35 kPa and −40 kPa in a gauge negative pressure, in order to increase the tightness between the capping member 13 and the disc substrate 11 and thereby prevent involving bubbles. And in this 5 kPa range, preferable results have been obtained that indicate no involving of bubbles. On the other hand, in order to prevent involving bubbles in the conventional structure in which the capping member is fixed onto the pin-shaped member, it has been necessary to adjust the pressing force with in a range between −35 kPa and −65 kPa in a gauge negative pressure. This pressure adjustment range is 30 kPa and broad, and there is a case in which high pressing force is required. Accordingly, in the present embodiment, since the pressing force is entirely reduced and since the most suitable pressing force can be obtained in the narrower adjustment range, in comparison to the conventional construction, the capping member 13 can be adsorbed onto the disc substrate 11 without causing curving and deformations of the disc substrate 11. Accordingly, it is possible to suppress involving bubbles.

When the center hole 11a of the disc substrate 11 is closed by the capping member 13, the liquid material is supplied in a circular manner onto the inclining section 13g of the capping member 13, by rotating the disc-supporting base 12 or by rotating a liquid-supplying nozzle. Subsequently, the disc-supporting base 12 is rotated in a high speed, and the liquid material is spread over the disc substrate 11 by centrifugal force. As mentioned in the above, in the present embodiment, since the capping member 13 is adsorbed onto the disc substrate 11 with entirely uniform pressing force, it is possible to suppress involving bubbles.

Furthermore, since there is no gap between the capping member 13 and the disc substrate 11, also at the time of removing the capping member 13 from the disc substrate 11 after spreading the liquid material, it is possible to prevent involving bubbles. After spreading the liquid material over the disc substrate 11, ultraviolet rays are radiated to cure the liquid material. Otherwise, the liquid material may be cured by irradiating the ultraviolet rays after overlapping the disc substrates 11 with each other, on which the liquid material is spread.

Second Embodiment

Figure 5:
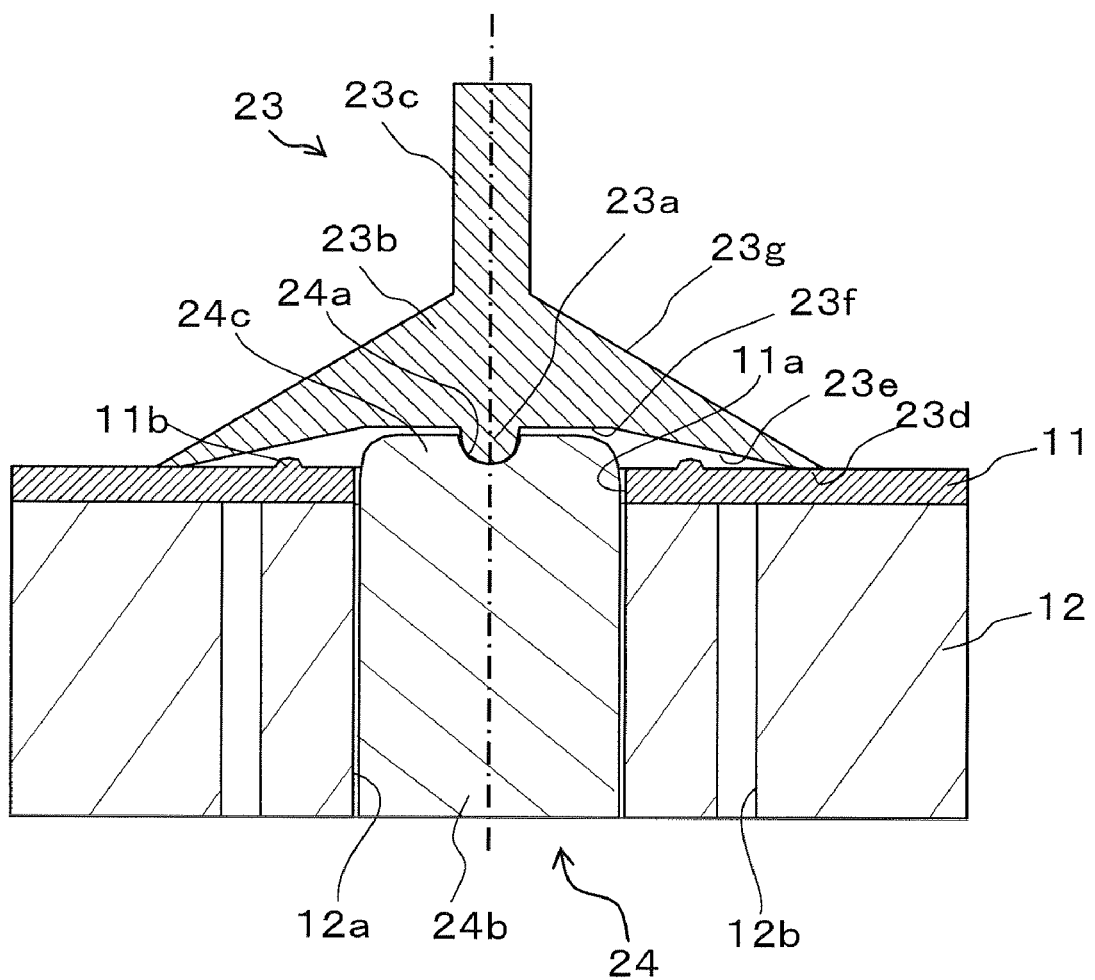
FIG. 5 shows a cross-sectional view of a manufacturing device for an optical disc, according to a second embodiment of the present invention.
Figure 6A:
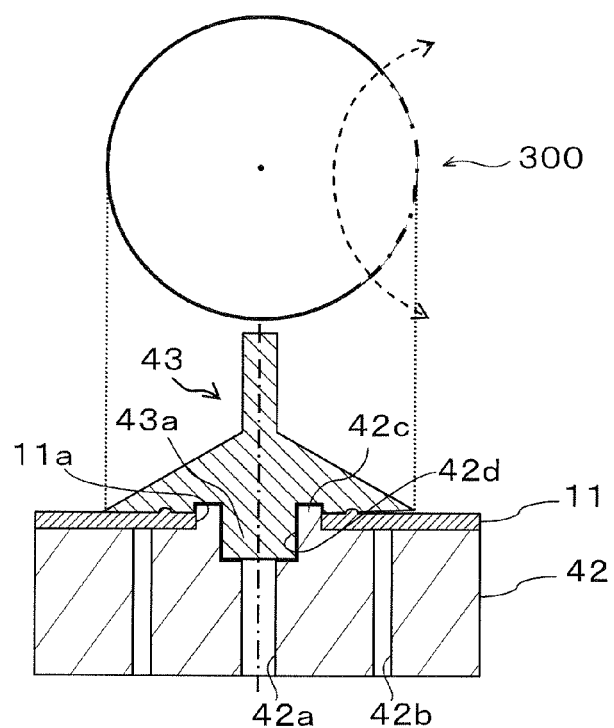
FIG. 6A shows a cross-sectional view of a conventional manufacturing device for an optical disc, and shows an operation thereof.
Figure 6B:
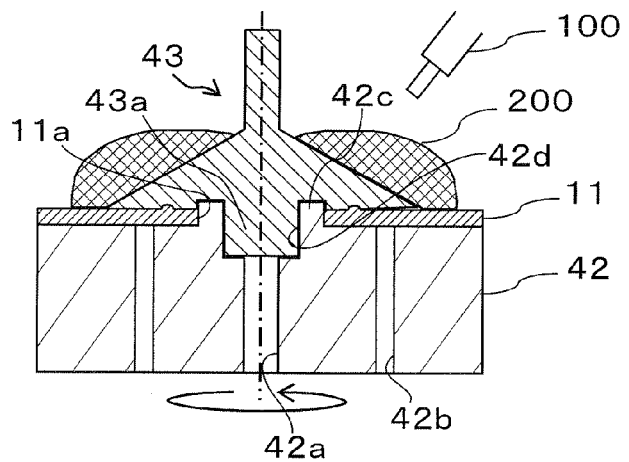
FIG. 6B shows a cross-sectional view of the conventional manufacturing device for an optical disc, and shows the subsequent operation thereof.
Figure 6C:
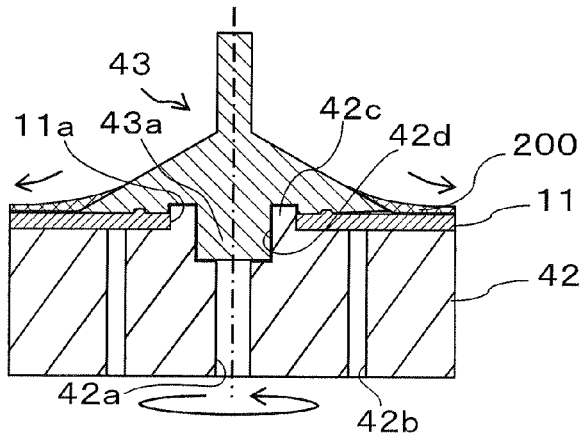
FIG. 6C shows a cross-sectional view of the conventional manufacturing device for an optical disc, and shows the subsequent operation thereof.

FIG. 5 shows a cross-sectional view of a manufacturing device for an optical disc, according to a second embodiment of the present invention. In the following explanation, explanations for the same constitute elements as those of the above-mentioned first embodiment shown in FIG. 1 are omitted here, and the differences will be explained below. The present embodiment mainly differs in the following points from the first embodiment in which the capping member 13 has the circular-shaped supported portion 13a while the pin-shaped member 14 has the supporting portion 14a formed in the arc-shaped cross-section for receiving the supported portion 13a. That is, the present embodiment has a capping member 23 having a spherical-shaped supported portion 23a formed at the center of a back face thereof, and a pin-shaped member 24 having a bowl-shaped supporting portion 24a formed at the top center of a protruding section 24c for supporting the spherical-shaped supported portion 23a.

That is, in the present embodiment, the supported portion 23a of the capping member 23 is supported at one point of the supporting portion 24a of the pin-shaped member 24, while the capping member 23 is slidable on the pin-shaped member 24 centering on the supported portion 23a. As same as the first embodiment, when the pin-shaped member 24 is lowered and a back-face ring-shaped portion 23d of the capping member 23 contacts the disc substrate 11, the capping member 23 slides on the supporting portion 24a of the pin-shaped member 24 centering on the axis of the supported portion 23a. As a result, the position of the capping member 23 is adjusted such that the entire of the back-face ring-shaped portion 23d uniformly contacts the disc substrate 11. That is, the pressing force applied onto the contacting portion on the disc substrate 11 can be uniform, and the capping member 23 can be adsorbed onto the disc substrate 11 to suppress involving bubbles.

Moreover, in the present embodiment, it is possible to form a protective film being a transparent layer on the surface of the disc substrate 11, by irradiating the ultraviolet rays on the liquid material spread over the disc substrate 11 to cure it. In addition, even in a process of forming an adhesion layer being a transparent layer between the disc substrates 11, by overlapping two disc substrates 11 each having the liquid material spread thereon so that the liquid materials on both sides overlap and by irradiating the ultraviolet rays thereon to cure them, the above-mentioned embodiment can be applied. Furthermore, it is also possible to manufacture a laminated optical disc by adhering the disc substrates which are adhered with each other as mentioned in the above, with another disc substrate.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A manufacturing device for an optical disc, comprising:
   a disc-supporting base on which a disc substrate is mounted;
   a pin-shaped member arranged at a center of the disc-supporting base, and is movable in the vertical in a center hole of the disc substrate; and
   a capping member which is slidably placed on a top of the pin-shaped member, and closes the center hole of the disc substrate, wherein:
   when the capping member placed on the top of the pin-shaped member is lowered such that a back face of the capping member contacts an around of the center hole of the disc substrate mounted on the disc-supporting base, the capping member slides on the top of the pin-shaped member; and
   the capping member is mounted on the top of the pin-shaped member such that: a direction of a center axis of the capping member is inclinable with respect to the disc-supporting base; and the capping member contacts the top of the pin-shaped member only with a circular-shaped line contact or a circular-shaped point contact or contacts a center of the top of the pin-shaped member only with a point contact.

2. The manufacturing device for an optical disc according to claim 1, wherein:
   the pin-shaped member has a supporting portion formed in an arc-shaped cross section; and
   the capping member has a circular-shaped supported portion having an edged cross-section that corresponds to the supporting portion.

3. The manufacturing device for an optical disc according to claim 1, wherein:
   the pin-shaped member has a supporting portion formed in a taper-shaped cross section; and
   the capping member has a circular-shaped supported portion formed in an edged cross-section that corresponds to the supporting portion.

4. The manufacturing device for an optical disc according to claim 1, wherein:
   the capping member has a back-face ring-shaped portion which contacts the around of the center hole of the disc substrate.

5. A manufacturing method for an optical disc, comprising:
   mounting a disc substrate on a disc-supporting base having a pin-shaped member that is movable in the vertical such that the pin-shaped member is inserted in a center hole of the disc substrate;
   placing a capping member on a top of the pin-shaped member inserted in the center hole of the disc substrate;
   lowering the pin-shaped member together with the capping member placed on the top of the pin-shaped member; and
   pressing the around of the center hole of the disc substrate mounted on the disc-supporting base with the capping member to close the center hole of the disc substrate, wherein
   when the pin-shaped member is lowered such that a back face of the capping member contacts the around of the center hole of the disc substrate, the capping member slides on the top of the pin-shaped member.

6. The manufacturing device for an optical disc according to claim 1, wherein
   the capping member is mounted on the top of the pin-shaped member with a magnetic force or a vacuum absorption to be held thereon.

* * * * *